United States Patent
Chen et al.

(10) Patent No.: US 11,394,886 B1
(45) Date of Patent: Jul. 19, 2022

(54) ELECTRONIC DEVICE AND CONTROL METHOD FOR IMAGE CAPTURE DEVICE THEREOF

(71) Applicant: ASUSTeK COMPUTER INC., Taipei (TW)

(72) Inventors: Kuan-Yuan Chen, Taipei (TW); Sheng-Hsiung Chang, Taipei (TW); Chun-Hsiang Chang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 17/385,938

(22) Filed: Jul. 27, 2021

(30) Foreign Application Priority Data

May 19, 2021 (TW) .................................. 110118060

(51) Int. Cl.
*H04N 5/232* (2006.01)
(52) U.S. Cl.
CPC ... *H04N 5/232935* (2018.08); *H04N 5/23216* (2013.01); *H04N 5/23296* (2013.01); *H04N 5/23299* (2018.08)
(58) Field of Classification Search
CPC ......... H04N 5/232935; H04N 5/23299; H04N 5/23216; H04N 5/23296
USPC .................................................. 348/333.01
See application file for complete search history.

(56) References Cited

U.S. PATENT DOCUMENTS

| | | | | |
|---|---|---|---|---|
| 8,692,907 B2* | 4/2014 | Arai | ...................... | G06T 3/0012 348/222.1 |
| 9,489,715 B2* | 11/2016 | Murakami | .............. | G06F 3/147 |
| 9,990,542 B2* | 6/2018 | Yang | ...................... | G06V 20/52 |
| 10,015,406 B2* | 7/2018 | Ogawa | ............. | H04N 5/232945 |
| 10,033,919 B2* | 7/2018 | Akaguma | .......... | H04N 5/23219 |
| 10,121,069 B2* | 11/2018 | Yang | ...................... | G06V 40/10 |
| 10,122,993 B2* | 11/2018 | Venkataraman | ..... | H04N 13/271 |
| 10,218,901 B2* | 2/2019 | Hao | .................... | H04N 5/23299 |
| 2013/0235086 A1* | 9/2013 | Otake | ................ | H04N 5/23296 345/660 |
| 2015/0264337 A1* | 9/2015 | Venkataraman | ..... | H04N 13/271 348/47 |
| 2018/0295281 A1* | 10/2018 | Hao | ......................... | G06T 7/60 |
| 2021/0365707 A1* | 11/2021 | Mao | ................. | H04N 5/232935 |

FOREIGN PATENT DOCUMENTS

| | | |
|---|---|---|
| CN | 104021571 | 9/2014 |
| CN | 110072064 | 7/2019 |
| CN | 112700381 | 4/2021 |

* cited by examiner

*Primary Examiner* — Pritham D Prabhakher
(74) *Attorney, Agent, or Firm* — JCIPRNET

(57) ABSTRACT

An electronic device and a control method for an image capture device thereof are provided. The control method includes: setting an initial visual field; tracking an object in the initial visual field to obtain a first reference position; obtaining a reference visual field according to the first reference position; generating visual field adjusting information according to the initial visual field and the reference visual field; and adjusting, based on the visual field adjusting information, the reference visual field to obtain a target visual field according to a size of the object, where an area ratio between an area of the object and an area of the target visual field is larger than a ratio threshold, and the area ratio is smaller than 1.

20 Claims, 18 Drawing Sheets

ELECTRONIC DEVICE AND CONTROL METHOD FOR IMAGE CAPTURE DEVICE THEREOF

CROSS-REFERENCE TO RELATED APPLICATION

This application claims the priority benefit of Taiwan application serial No. 110118060, filed on May 19, 2021. The entirety of the above-mentioned patent application is hereby incorporated by reference herein and made a part of the specification.

BACKGROUND OF THE INVENTION

Field of the Invention

The disclosure is related to an electronic device and a control method for an image capture device thereof.

Description of the Related Art

In the related art, when using a mobile phone to record a video of a moving object which is far away, a user usually intends to keep the object at a certain size in a preview image. However, the user needs to operate the mobile phone in that way and cannot hold the mobile phone stablely for a long time. For example, the user zooms in or out the preview image by manual operations with one hand, and moves the mobile phone to continuously track the moving object by another hand. As a result, the video taken is shaky and has poor image quality.

BRIEF SUMMARY OF THE INVENTION

According to the first aspect, a method for controlling a preview image is provided. The control method includes: setting an initial visual field; tracking an object in the initial visual field to obtain a first reference position; obtaining a reference visual field according to the first reference position; generating visual field adjusting information according to the initial visual field and the reference visual field; and adjusting, based on the visual field adjusting information, the reference visual field to obtain a target visual field according to a size of the object, where an area ratio between an area of the object and an area of the target visual field is larger than a ratio threshold, and the area ratio is smaller than 1.

According to the second aspect, an electronic device is provided. The electronic device includes an image capture device, a display and a controller. The image capture device has an initial visual field. The display is configured to display a preview image. The controller is coupled to the image capture device and the display. The controller is configured to following steps: tracking an object in the initial visual field to obtain a first reference position; generating visual field adjusting information according to the initial visual field and the reference visual field; and adjusting, based on the visual field adjusting information, the reference visual field to obtain a target visual field according to a size of the object, where an area ratio between an area of the object and an area of the target visual field is larger than a ratio threshold, and the area ratio is smaller than 1.

Based on the above, by executing the method for controlling a preview image, when the electronic device performs zooming in or out the preview image according to a dynamic change of the object, the object is maintained at a certain ratio in the preview image. In embodiments of the disclosure, the electronic device adjusts an image capturing direction of the image capture device according to a position of the object, so that the object is continuously displayed at a set position in the preview image, thereby enhancing the visual comfort of the user.

DETAILED DESCRIPTION OF THE EMBODIMENTS

Figure 1:
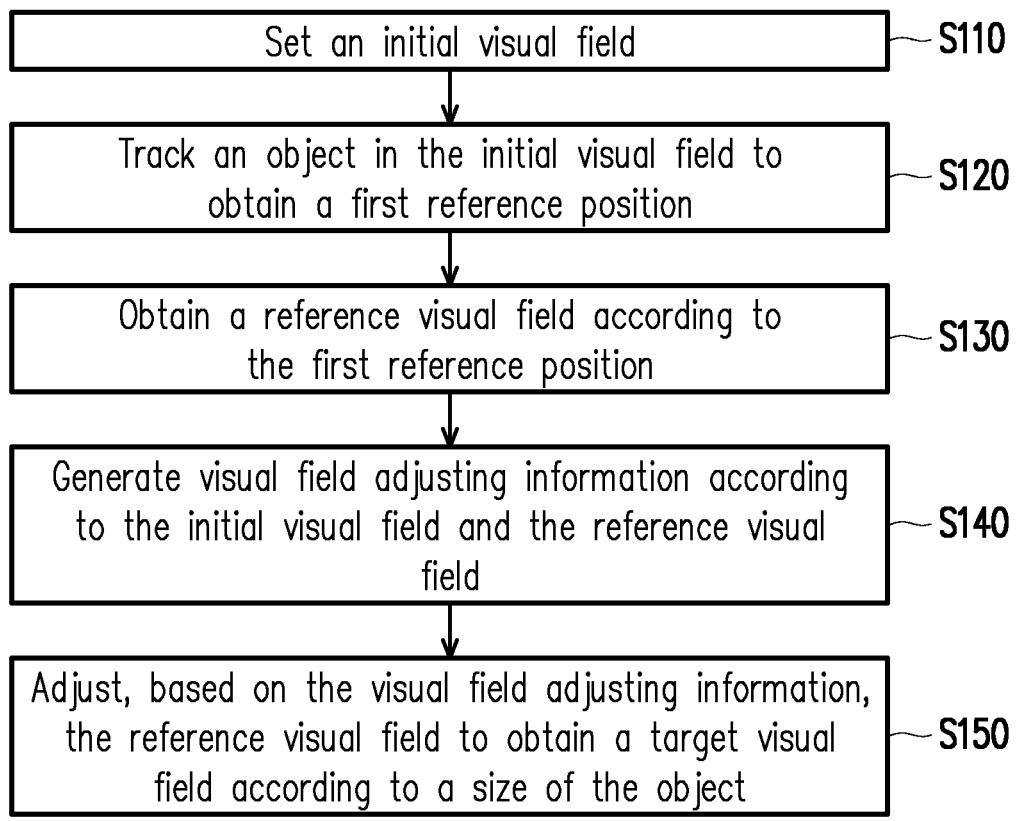
FIG. 1 is a flowchart of a method for controlling a preview image according to an embodiment of the disclosure.
Figure 2A:
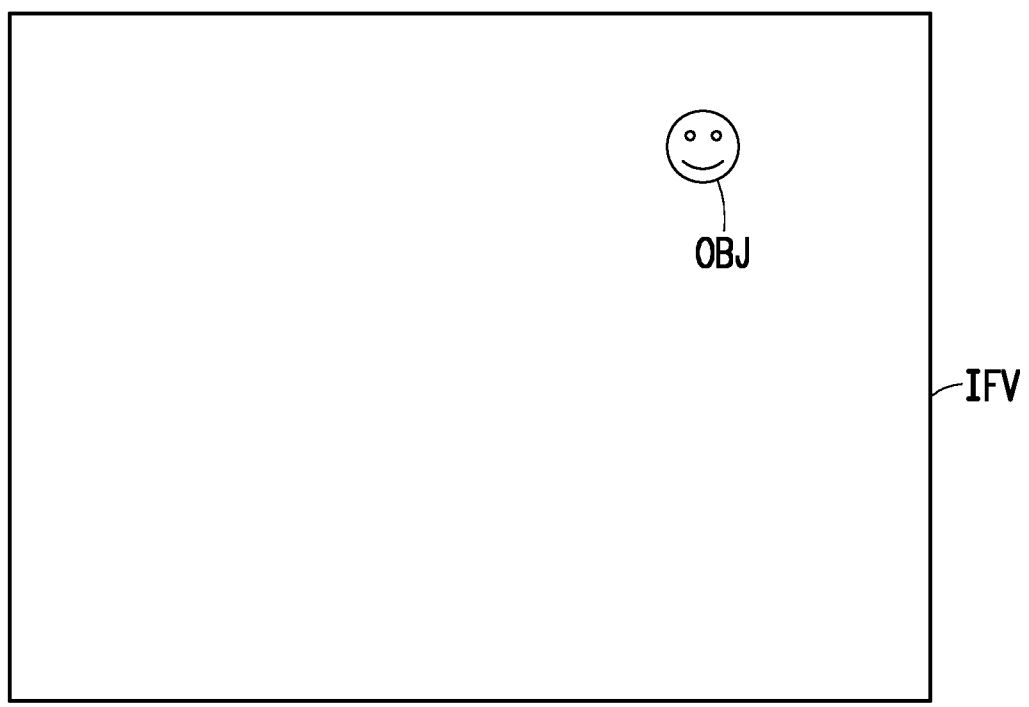
FIG. 2A and FIG. 2B are schematic diagrams showing actions of controlling a preview image.
Figure 2B:
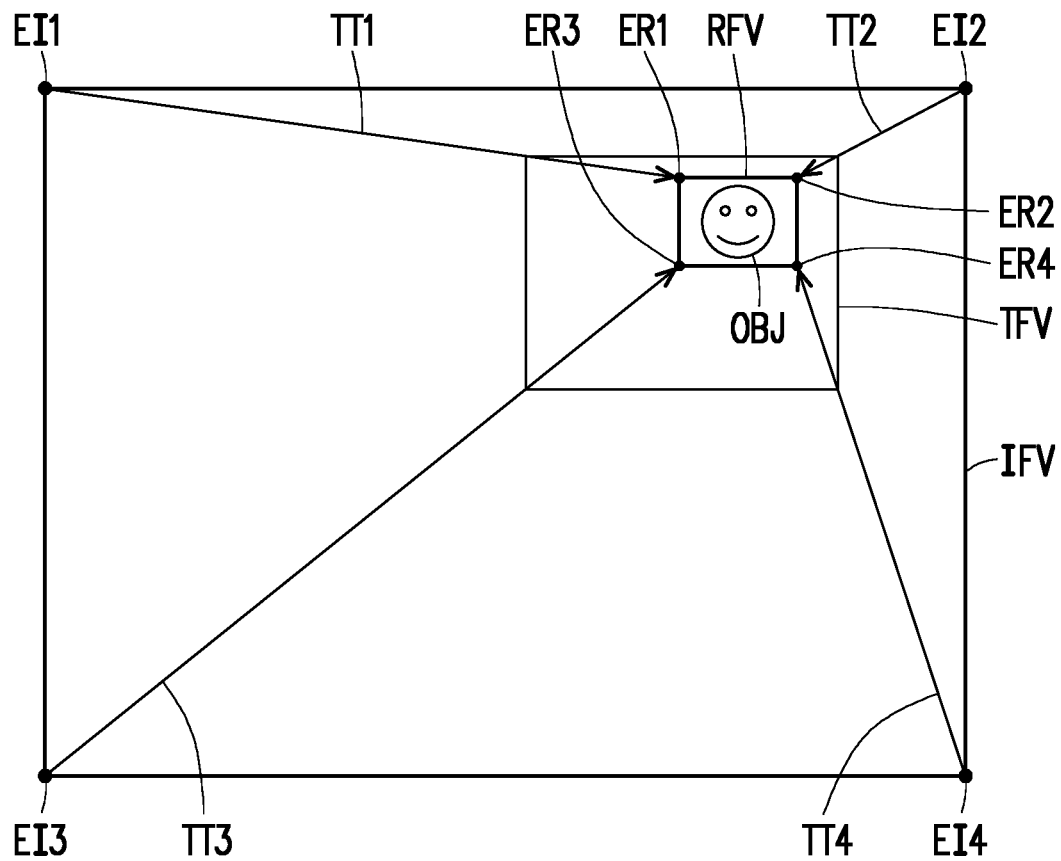

Referring to FIG. 1, FIG. 2A and FIG. 2B, FIG. 1 is a flowchart of a method for controlling a preview image according to an embodiment of the disclosure, and FIG. 2A and FIG. 2B are schematic diagrams showing actions of controlling a preview image. The method for controlling a preview image (referring to an embodiment of FIG. 7A) of this embodiment is applicable to an image capture device (referring to the embodiment of FIG. 7A). The method for controlling a preview image is executed by a controller (referring to the embodiment of FIG. 7A). Referring to FIG. 2A, in step S110, the controller sets an initial visual field IFV. In this embodiment, the initial visual field IFV is a maximum visual field captured by the image capture device. The initial visual field IFV is a visual field of the image capture device when a magnification (that is the first magnification) is equal to 1. Then, in step S120, a controller tracks an object OBJ in the initial visual field, and obtains a reference position of the object OBJ in the initial visual field IFV.

Corresponding to FIG. 2B, in step S130, the controller obtains a reference visual field RFV according to the reference position of the object OBJ. In this embodiment, the reference position of the object OBJ is a center position of the object OBJ. The reference visual field RFV is a minimum visual field centered at the reference position when the magnification (that is the second magnification) is M. In some embodiments, M is a maximum magnification of the image capture device, and M is any real number larger than 1.

Then, in step S140, the controller generates visual field adjusting information according to the initial visual field IFV and the reference visual field RFV. To be specific, the controller identifies four first endpoints E11 to E14 of the initial visual field IFV, and identifies four second endpoints ER1 to ER4 of the reference visual field RFV, where the first endpoints E11 to E14 are respectively corresponding to the second endpoints ER1 to ER4. The controller generates a visual field adjusting path TT1 according to the first endpoint E11 and the second endpoint ER1 that are corresponding to each other; generates a visual field adjusting path TT2 according to the first endpoint E12 and the second endpoint ER2 that are corresponding to each other; generates a visual field adjusting path TT3 according to the first endpoint E13 and the second endpoint ER3 that are corresponding to each other; and generates a visual field adjusting path TT4 according to the first endpoint E14 and the second endpoint ER4 that are corresponding to each other. To be specific, the controller generates the visual field adjusting paths TT1 to TT4 according to connections between the first endpoints E11 to E14 and the second endpoints ER1 to ER4, and generates visual field adjusting information.

In step S150, based on the visual field adjusting information, the controller adjusts the reference visual field RFV to obtain a target visual field TFV according to a size of the object OBJ by zooming in, where an area of the target visual field TFV is larger than an area of the object OBJ. It should be noted that, the controller causes an area ratio between the area of the object OBJ and the area of the target visual field TFV to be larger than a ratio threshold and smaller than 1. In this way, the object OBJ takes up a certain proportion of the area of the target visual field TFV, thereby enhancing the visual comfort of the user.

The above ratio threshold is a value smaller than 1, and is preset or set by the user.

Furthermore, after the target visual field TFV is generated, the controller zooms in or out a display area on the preview image, where the display area of the preview image is consistent with the target visual field TFV.

Figure 3A:
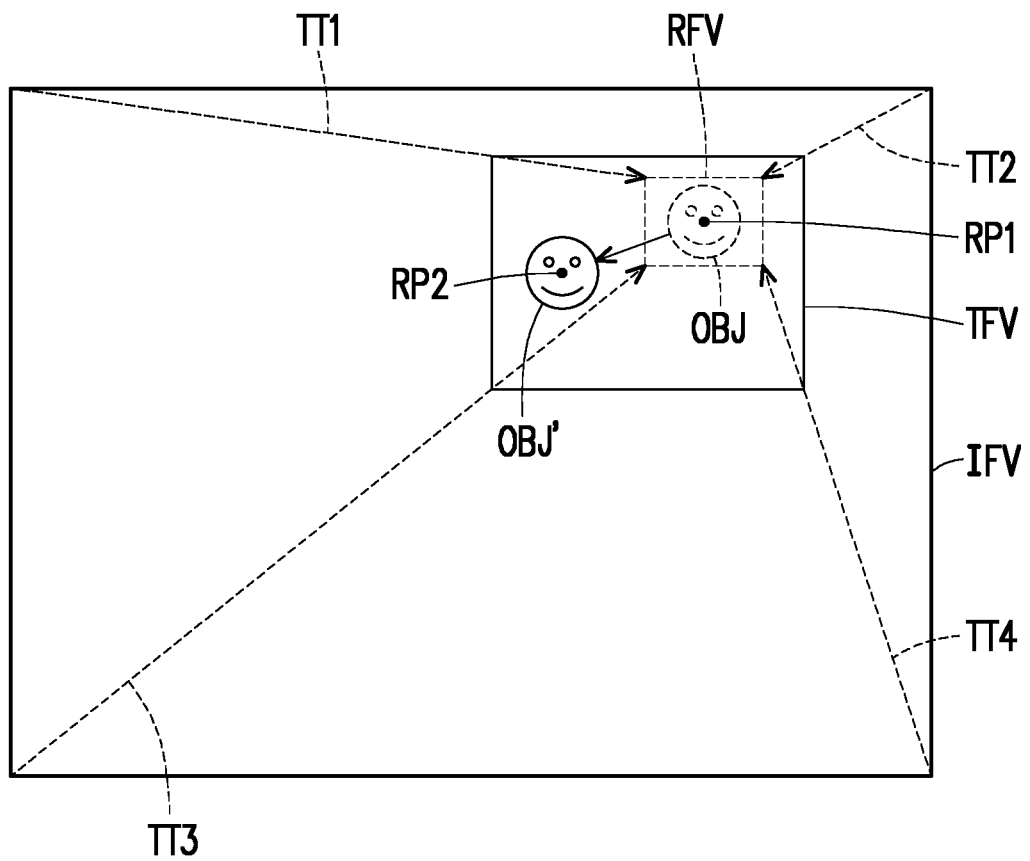
FIG. 3A to FIG. 3C are schematic diagrams showing actions of controlling a preview image according to another embodiment of the disclosure.
Figure 3B:
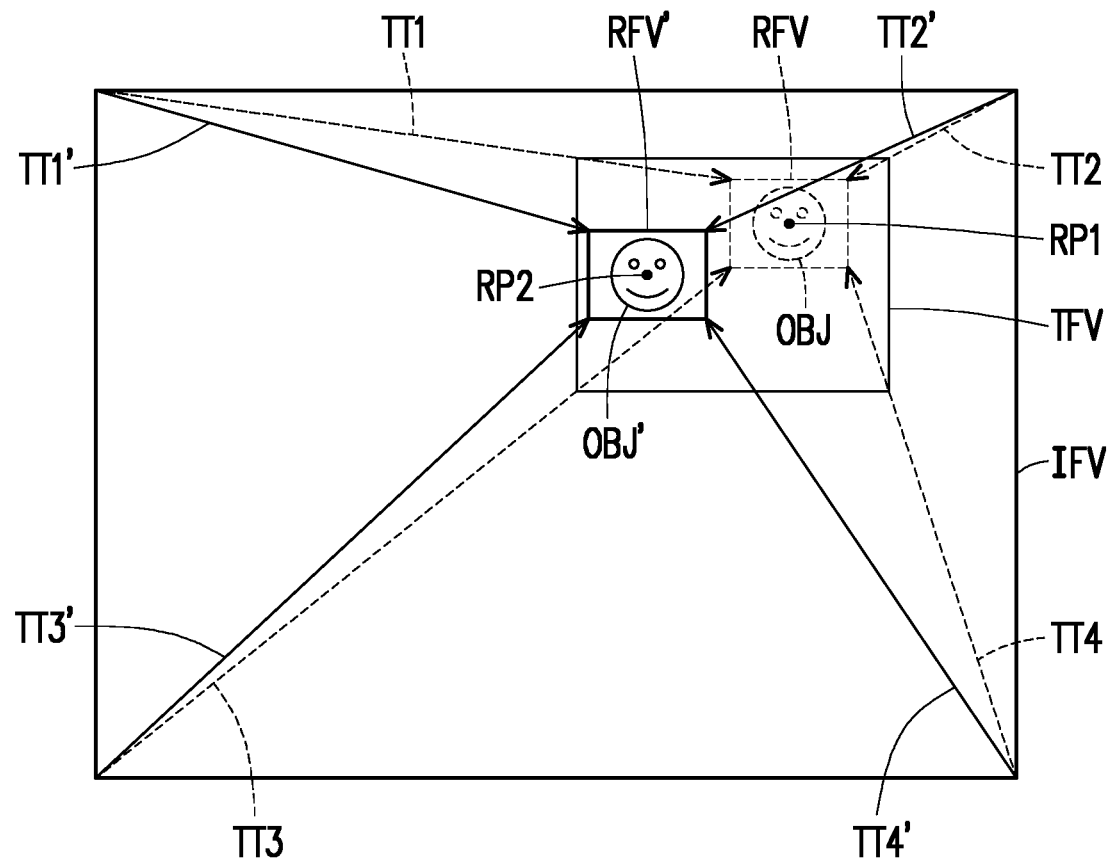
Figure 3C:
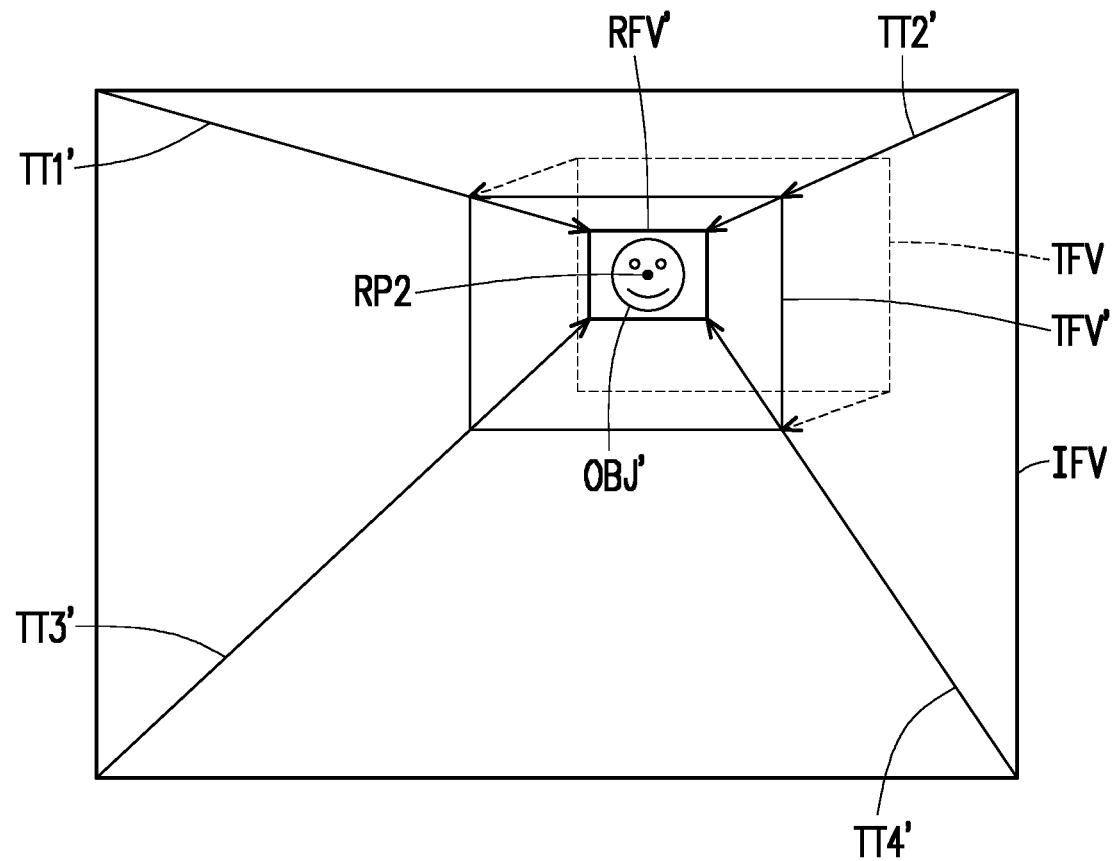

Referring to FIG. 3A to FIG. 3C hereinafter, FIG. 3A to FIG. 3C are schematic diagrams of controlling a preview image according to another embodiment of the disclosure. In FIG. 3A, by tracking the object OBJ in the initial visual field IFV, the controller generates the reference visual field RFV according to a first reference position RP1 of the object OBJ, and further generates the target visual field TFV according to the visual field adjusting information of the visual field adjusting paths TT1 to TT4.

It should be noted that, when the object OBJ moves from the first reference position RP1 to a second reference position RP2 (object OBJ'), a distance between the first reference position RP1 of the object OBJ and the second reference position RP2 of the object OBJ' is larger than a preset distance threshold. In this embodiment, the controller obtains an updated reference visual field RFV' according to the second reference position RP2 of the object OBJ, referring to FIG. 3B. In this embodiment, the first reference position RP1 and the second reference position RP2 are set respectively according to geometric centers of the object OBJ and the object OBJ'.

Then, the controller generates an updated visual field adjusting information including updated visual field adjusting paths TT1' to TT4' according to positions of the second endpoints of the updated reference visual field RFV' and the positions of the first endpoints of the initial visual field IFV. In FIG. 3C, the controller generates an updated target visual field TFV' according to the updated visual field adjusting paths TT1' to TT4'. The object OBJ' is in the updated target visual field TFV' and takes up a ratio threshold of an area of the updated target visual field TFV'.

Further, after the updated target visual field TFV' is generated, the controller causes the display to zoom in or out the display area of the preview image, so that the display area of the preview image is consistent with the updated target visual field TFV'.

The above ratio threshold is set by the designer or by the user.

Figure 4A:
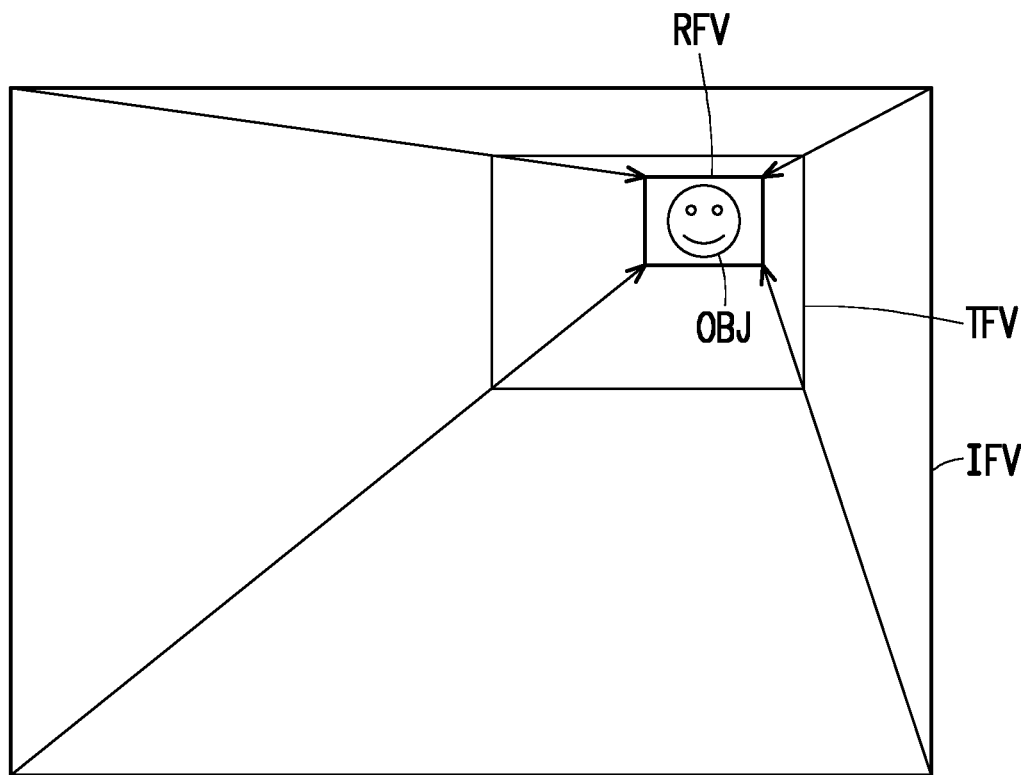
FIG. 4A to FIG. 4C are schematic diagrams showing actions of controlling a preview image according to another embodiment of the disclosure.
Figure 4B:
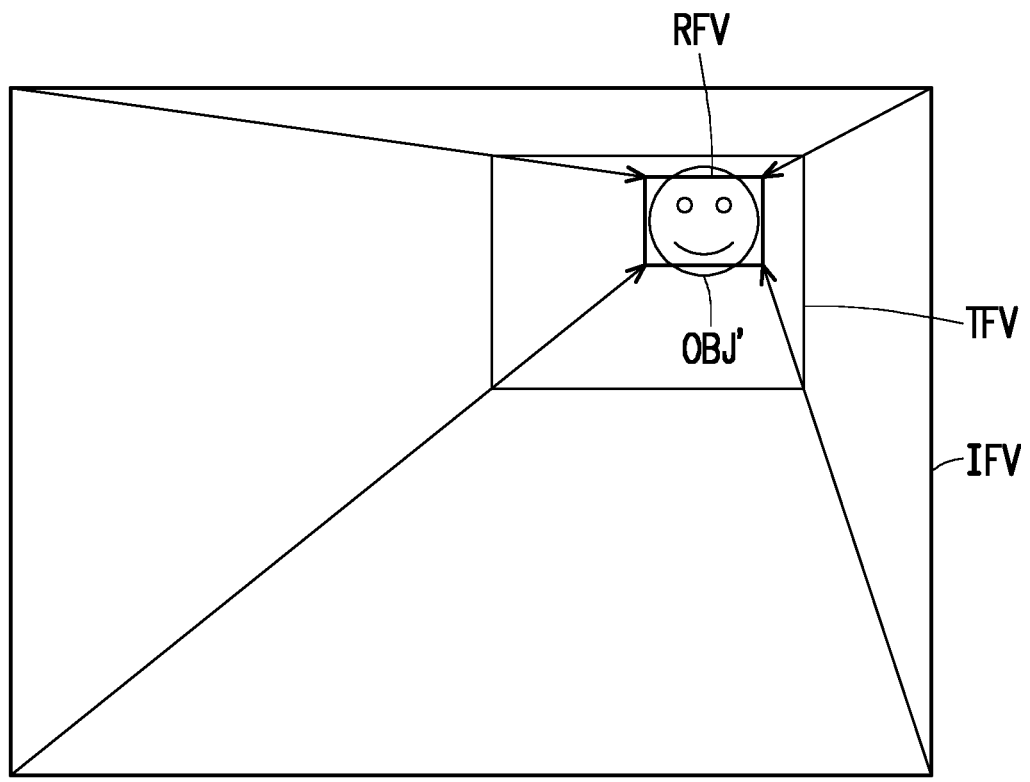
Figure 4C:
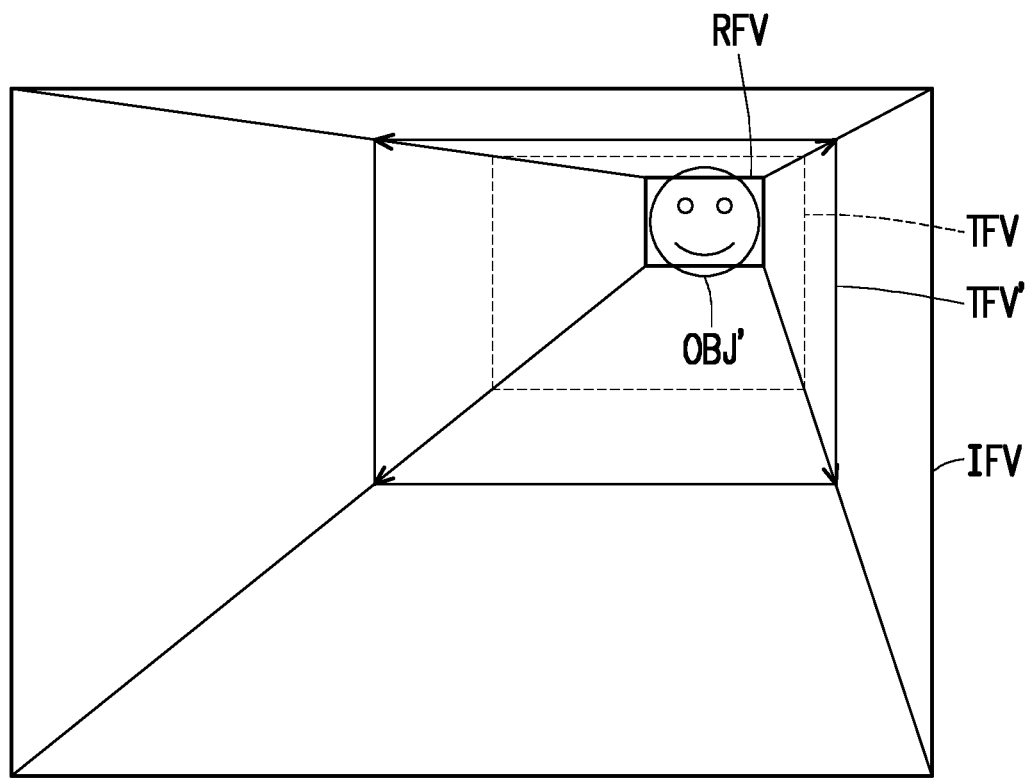

Referring to FIG. 4A to FIG. 4C hereinafter, FIG. 4A to FIG. 4C are schematic diagrams showing actions of controlling a preview image according to another embodiment of the disclosure.

The actions of controlling the preview image in this embodiment are also executable by the controller. In FIG. 4A, the object OBJ located in the initial visual field IFV is tracked. The controller establishes the reference visual field RFV according to the reference position of the object OBJ, and sets the target visual field TFV according to the reference visual field RFV.

In FIG. 4B, the controller continues to track the object OBJ. When the size of the object OBJ changes (where the size of the object OBJ is enlarged in an embodiment) and the enlarged object OBJ' is outside the range of the reference visual field RFV, the controller calculates an area ratio between an area of the object OBJ' and the area of the target visual field TFV, and compares the calculated area ratio with a ratio range. In FIG. 4B, the area ratio calculated by the controller is larger than an upper bound of the ratio range, indicating that the size of the object OBJ is excessively large and is not suitable for preview. Correspondingly, referring to FIG. 4C, the controller correspondingly increases the size of the target visual field TFV to obtain an updated target visual field TFV'. It should be noted herein that in some embodiments, in FIG. 4C, an area ratio between the area of the object OBJ and the area of the updated target visual field TFV' is equal to a preset ratio threshold. In some embodiments, the ratio threshold is set at the center of the ratio range.

Figure 5A:
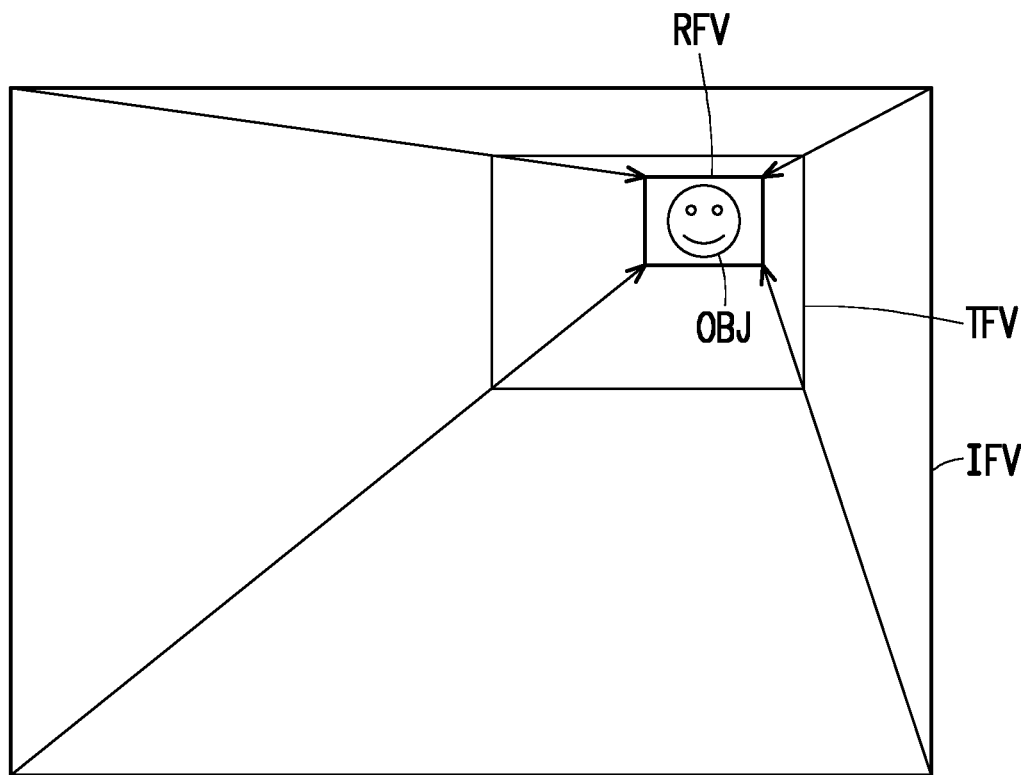
FIG. 5A to FIG. 5C are schematic diagrams showing actions of controlling a preview image according to another embodiment of the disclosure.
Figure 5B:
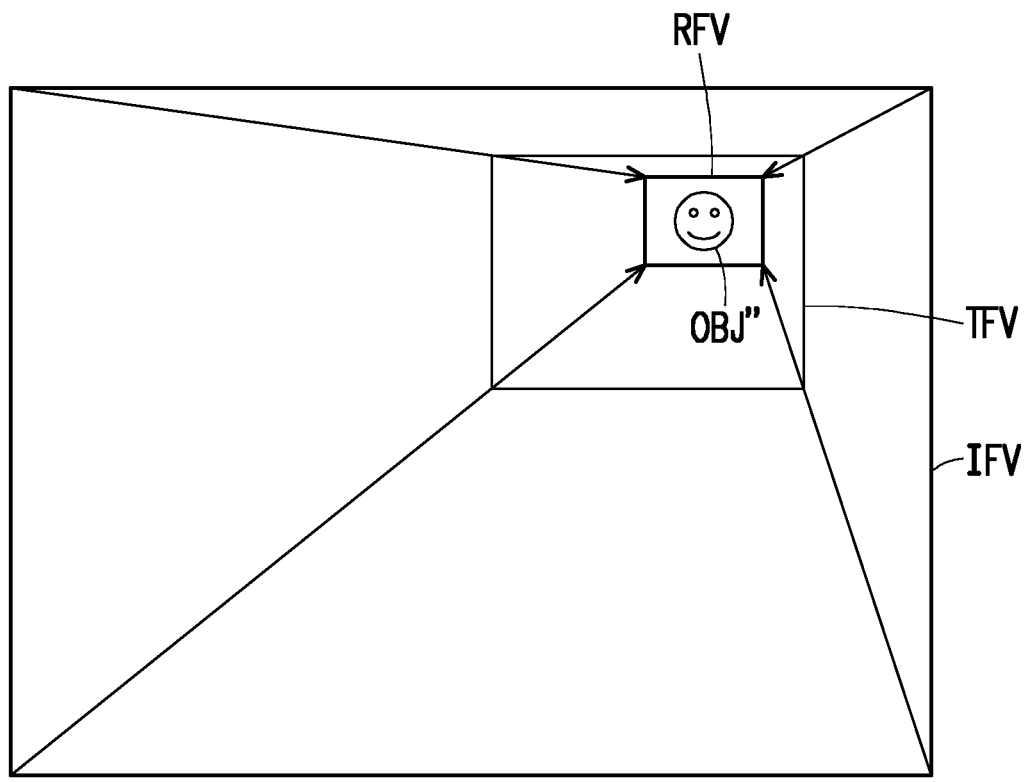
Figure 5C:
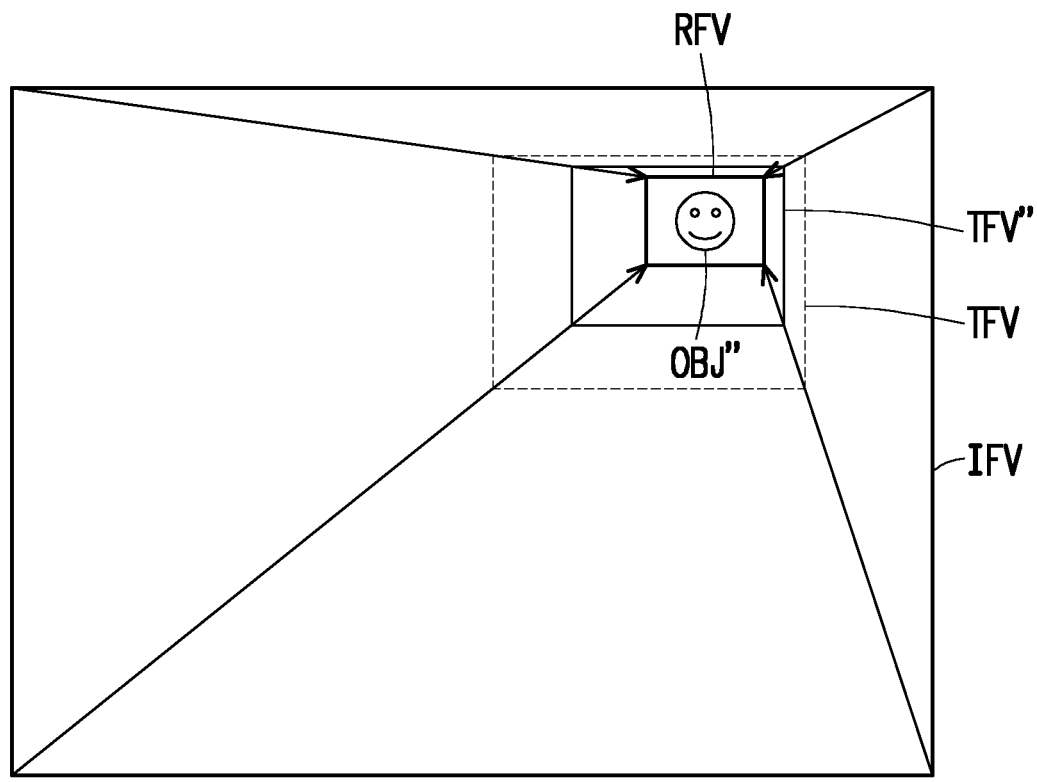

Referring to FIG. 5A to FIG. 5C hereinafter, FIG. 5A to FIG. 5C are schematic diagrams showing actions of controlling a preview image according to another embodiment of the disclosure.

The actions of controlling the preview image in this embodiment are also executable by the controller. In FIG. 5A, the object OBJ located in the initial visual field IFV is tracked. According to the reference position of the object OBJ, the controller establishes the reference visual field RFV, and sets the target visual field TFV according to the reference visual field RFV.

In FIG. 5B, the controller continues to track the object OBJ. When the size of the object OBJ changes (where the size of the object OBJ is reduced in an embodiment), the controller calculates an area ratio between an area of an object OBJ" and the area of the target visual field TFV, and compares the calculated area ratio with a ratio range. In FIG. 5B, the area ratio calculated by the controller is smaller than a lower bound of the ratio range, indicating that the size of the object OBJ" is excessively small and is not suitable for preview. Correspondingly, referring to FIG. 5C, the controller correspondingly decreases the size of the target visual field TFV to obtain an updated target visual field TFV'". It should be noted herein that in some embodiments, in FIG. 4C, an area ratio between the area of the object OBJ" and an area of the updated target visual field TFV'" is equal to the preset ratio threshold.

With reference to the embodiments of FIG. 4A to FIG. 4C and FIG. 5A to FIG. 5C, it is easily learned that, when the size of the object OBJ changes, the disclosure adaptively adjusts the target visual field (which is the target visual field TFV' or TFV'' in some embodiments), so as to maintain the area proportion of the object OBJ in the preview image, ensuring comfort of the user during preview.

Figure 6A:
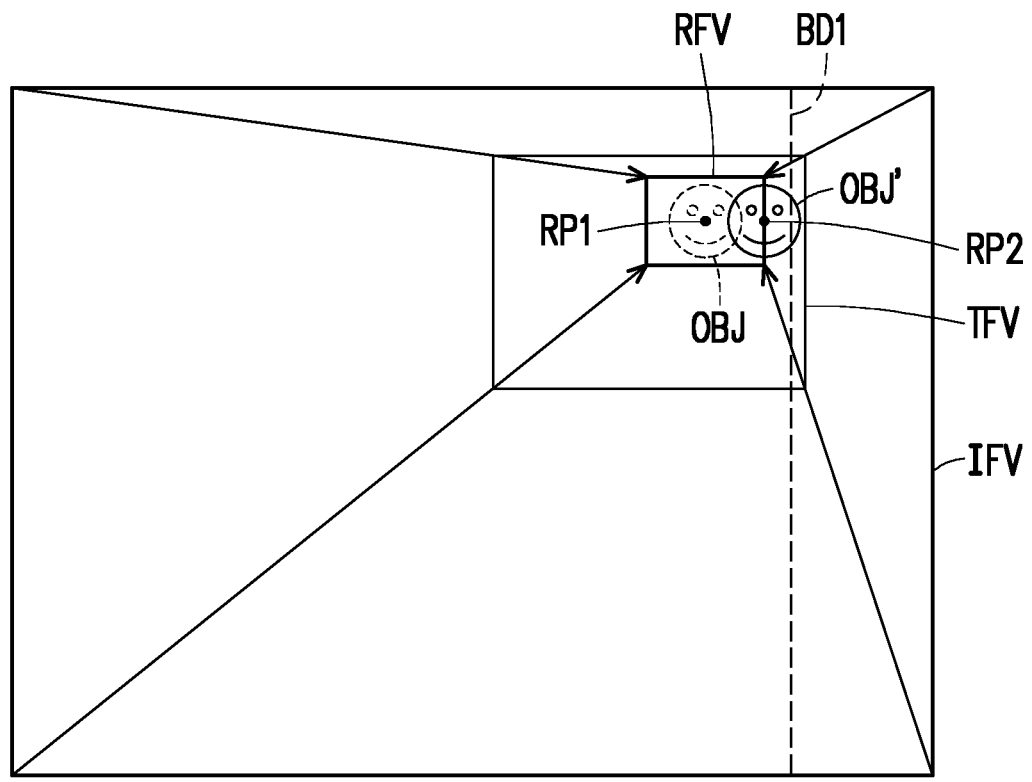
FIG. 6A to FIG. 6D are schematic diagrams showing actions of controlling a preview image according to another embodiment of the disclosure.

Referring to FIG. 6A to FIG. 6D hereinafter, FIG. 6A to FIG. 6D are schematic diagrams showing actions of controlling a preview image according to another embodiment of the disclosure. In FIG. 6A, the object OBJ is in the initial visual field IFV. By tracking the object OBJ, the controller sets a reference visual field RFV according to the reference position of the object OBJ, and establishes a target visual field TFV according to the reference visual field RFV. The target visual field TFV is used to generate the preview image.

It is worth mentioning that, in an embodiment, a boundary BD1 is further set at an edge of the initial visual field IFV. The controller detects a position relationship between the object OBJ and the boundary BD1. In FIG. 6A, in an embodiment, when the object OBJ moves from the first reference position RP1 to the second reference position RP2 and becomes the object OBJ' and the controller detects that a distance between the object OBJ' and the boundary BD1 is smaller than a preset reference value, an image capturing direction of the image capture device is adjusted according to a set direction SDIR, and the object OBJ is adjusted to a set position in the initial visual field IFV, as shown in FIG. 6B.

In some embodiments, the set position is determined according to the set direction SDIR, and the set direction SDIR is determined by a position of the boundary BD1. In FIG. 6A, the boundary BD1 is located at a first side of the initial visual field IFV in a horizontal direction. Therefore, the set direction SDIR for the adjustment of the image capturing direction of the image capture device is a horizontal direction extending away from the boundary BD1, and the set position is a center position of the initial visual field IFV in the horizontal direction.

Figure 6B:
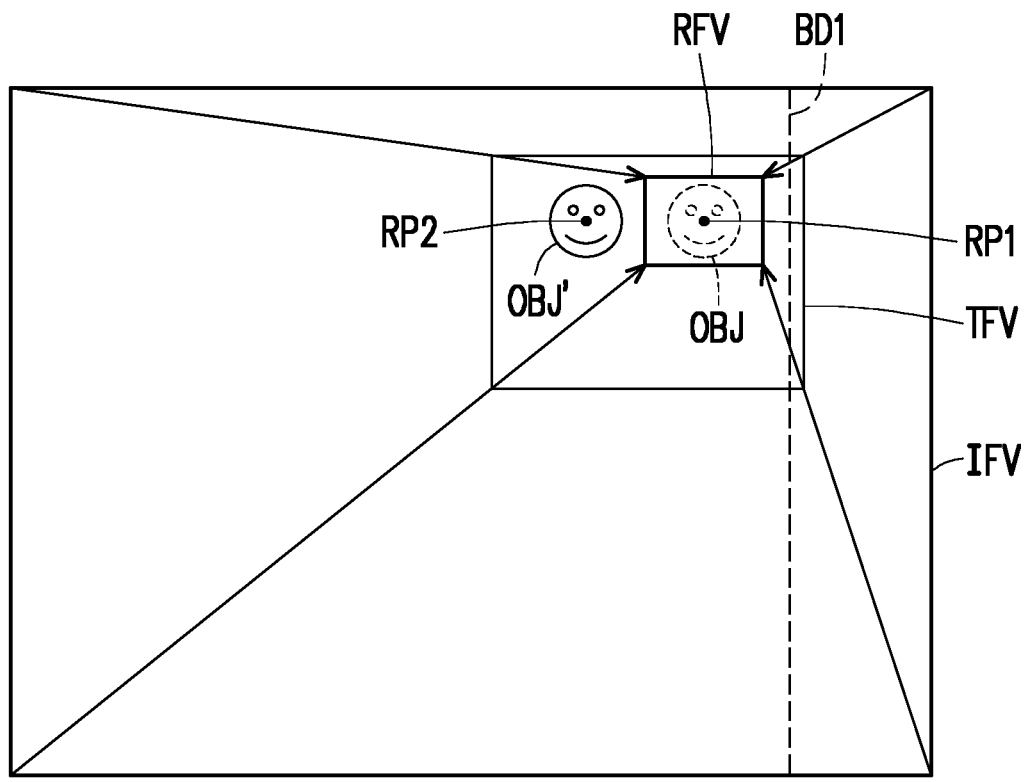
Figure 6C:
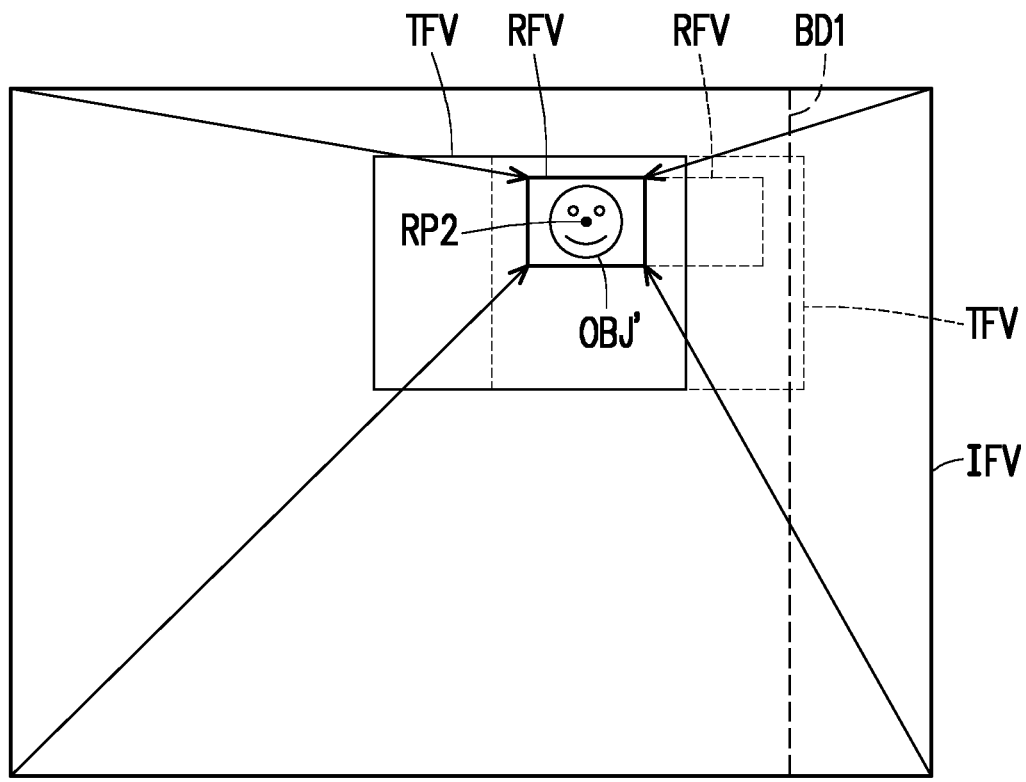

It should be noted that in some embodiments, after the image capturing direction of the image capture device is adjusted in FIG. 6B, the object OBJ' is outside the reference visual field RFV. In this case, in FIG. 6C, the controller sets a new reference visual field RFV' according to a new second reference position RP2 of the object OBJ', and establishes a new target visual field TFV' according to the new reference visual field RFV'. In this way, a new preview image is generated according to the target visual field TFV', to prevent the object OBJ from moving outside of the preview image, thereby ensuring effective tracking of the object OBJ.

Figure 6D:
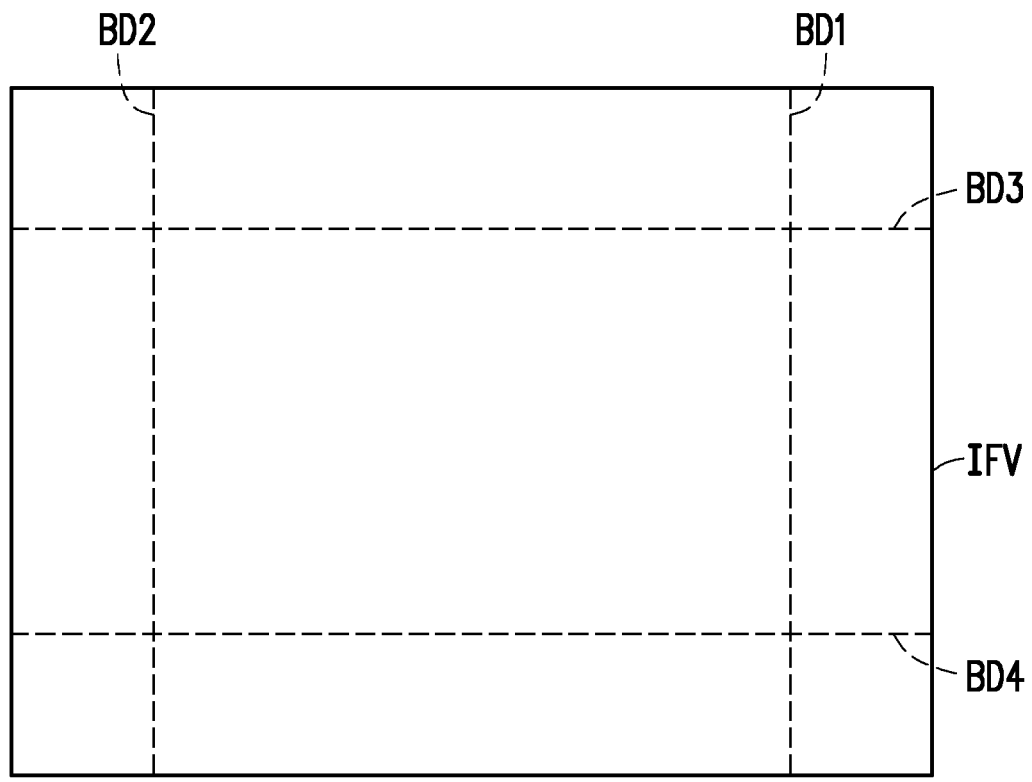

It is worth mentioning that, in FIG. 6D, when the initial visual field IFV is rectangular, four boundaries BD1 to BD4 are set for the initial visual field IFV in some embodiments. When the object OBJ is excessively close to the boundary BD1 and the boundary BD2 in the horizontal direction, the image capturing direction of the image capture device is horizontally adjusted. When the object OBJ is excessively close to the boundary BD3 and the boundary BD4 in the vertical direction, the image capturing direction of the image capture device is vertically adjusted.

Figure 7A:
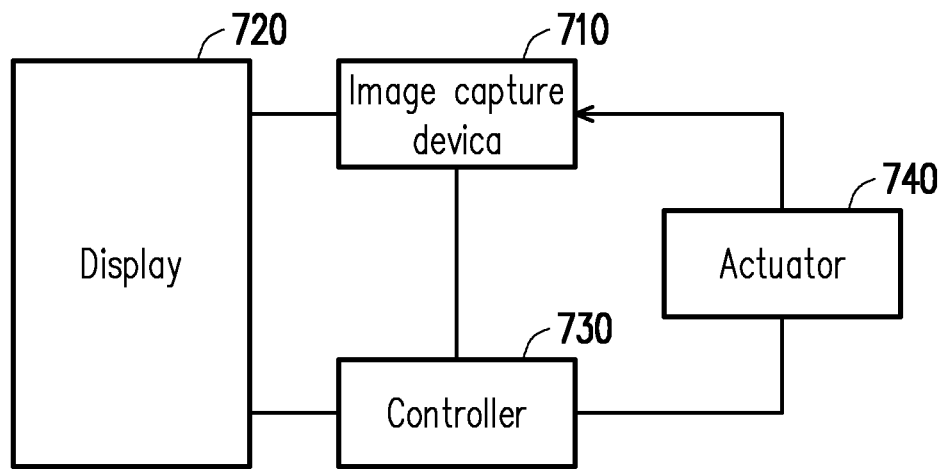
FIG. 7A is a schematic diagram of an electronic device according to an embodiment of the disclosure.

Referring to FIG. 7A. FIG. 7A is a schematic diagram of an electronic device according to an embodiment of the disclosure. The electronic device 700 includes an image capture device 710, a display 720 and a controller 730. In some embodiments, the image capture device 710 is a camera, and the image capture device 710 is configured to capture a static or dynamic video. The display 720 is configured to generate a preview image according to the video captured by the image capture device 710. The controller 730 is coupled to the image capture device 710 and the display 720, and the controller 730 is configured to execute a plurality of steps of a method for controlling a preview image. The controller 730 is configured to execute a plurality of steps shown in the embodiments of FIG. 1 to FIG. 6D, to effectively keep the object OBJ at an effective area ratio in the preview image. Therefore, the visual comfort of the user is enhanced.

Figure 7B:
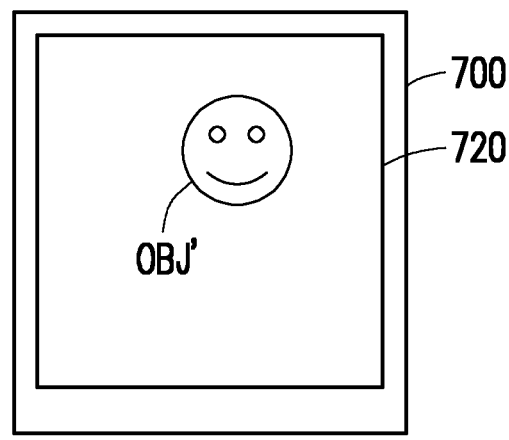
FIG. 7B is a schematic diagram of an implementation of a preview image of an electronic device according to an embodiment of the disclosure.

For the preview image, referring to FIG. 7B, FIG. 7B is a schematic diagram of an implementation of a preview image of an electronic device according to an embodiment of the disclosure. In FIG. 7B, compared with the implementation of FIG. 3C of the disclosure, the display 720 of the electronic device 700 is configured to generate the preview image to display the object OBJ'. The updated target visual field TFV' overlaps a maximum displaying screen of the display 720, and the object OBJ' is kept at a specific position in the preview image and at a certain display ratio.

Referring to FIG. 7A again, in some embodiments, the controller 730 is a processor with computing capability, and is configured to run an application program to execute the controlling of the preview image in the foregoing embodiments. In some other embodiments, the controller 730 is a hardware circuit designed using a Hardware Description Language (HDL) or other digital circuit design methods well known to those of ordinary skill in the art, and implemented by a Field Programmable Gate Array (FPGA), Complex Programmable Logic Device (CPLD) or Application-specific Integrated Circuit (ASIC).

Figure 8:
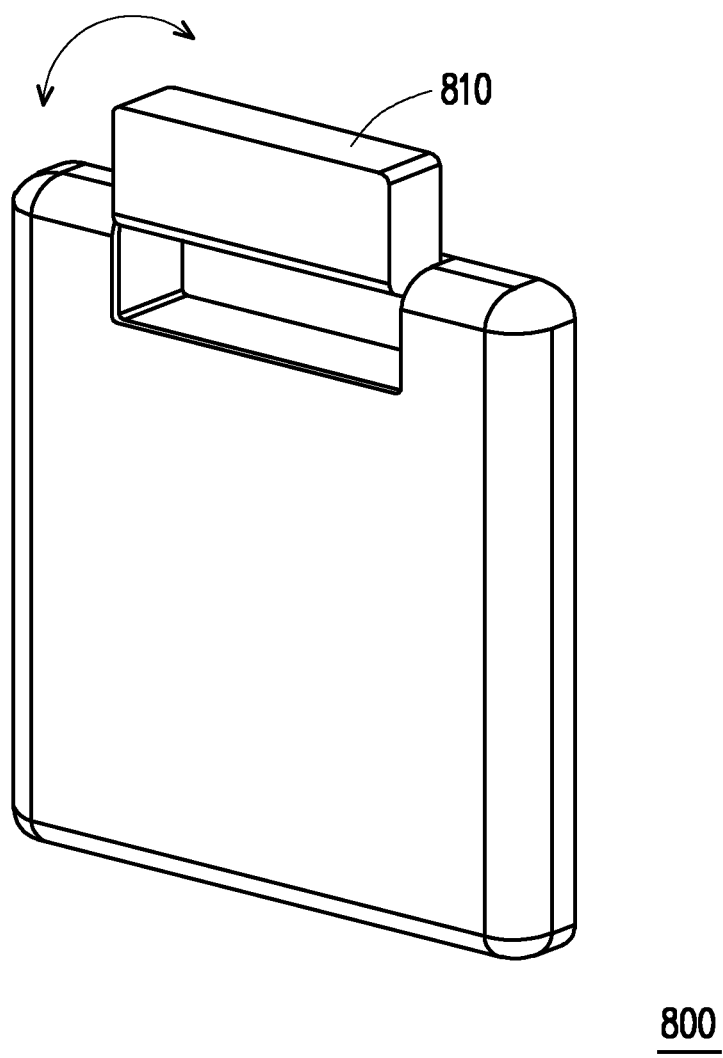
FIG. 8 is a schematic diagram of an implementation of an electronic device according to an embodiment of the disclosure.

It is worth mentioning that, the electronic device 700 of the embodiments of the disclosure further includes an actuator 740. The actuator 740 is coupled to the image capture device 710 and the controller 730. When the controller 730 executes the embodiments of FIG. 6A to FIG. 6D, the controller 730 causes the image capture device 710 to rotate, and adjusts the image capturing direction of the image capture device. FIG. 8 is a schematic diagram of an implementation of an electronic device according to an embodiment of the disclosure. The electronic device 800 is a hand-held electronic device (which is a smartphone in some embodiments). An image capture device 810 is disposed at a side of the electronic device 800, and is driven by an actuator to rotate, to adjust the image capturing direction of the image capture device.

In the embodiment of FIG. 7A, the actuator 740 is a motor in any form.

To sum up, when tracking a position of an object, adjusting a target visual field according to the position of the object, and generating a preview image according to the target visual field, the disclosure effectively maintains the size and the position of the object in the preview image, thereby enhancing the visual comfort of the user.

What is claimed is:
1. A method for controlling a preview image, applicable to an image capture device, the method comprising:
   setting an initial visual field;
   tracking an object in the initial visual field to obtain a first reference position;
   obtaining a reference visual field according to the first reference position;
   generating visual field adjusting information according to the initial visual field and the reference visual field; and adjusting, based on the visual field adjusting information, the reference visual field to obtain a target visual field according to a size of the object,
wherein an area ratio between an area of the object and an area of the target visual field is larger than a ratio threshold, and the area ratio is smaller than 1.

2. The control method according to claim 1, wherein the step of setting the initial visual field comprises:
setting the initial visual field according to a first magnification.

3. The control method according to claim 2, wherein the step of obtaining the reference visual field according to the reference position comprises:
setting, based on the reference position, the reference visual field according to a second magnification,
wherein the second magnification is M times the first magnification, and M is a real number larger than 1.

4. The control method according to claim 1, wherein the step of generating the visual field adjusting information according to the initial visual field and the reference visual field comprises:
detecting a plurality of first endpoints of the initial visual field and a plurality of second endpoints of the reference visual field; and
obtaining a plurality of visual field adjusting paths according to the first endpoints and the second endpoints respectively corresponding to the first endpoints, and generating the visual field adjusting information.

5. The control method according to claim 1, further comprising:
Zooming in or out a display area of the preview image, so that the display area of the preview image is consistent with the target visual field.

6. The control method according to claim 1, further comprising:
obtaining an updated reference visual field according to the second reference position when the object moves from the first reference position to a second reference position and a distance between the second reference position and the first reference position is larger than a default distance threshold;
generating updated visual field adjusting information according to the initial visual field and the updated reference visual field; and
adjusting the target visual field according to the updated visual field adjusting information to obtain an updated target visual field.

7. The control method according to claim 6, further comprising:
Zooming in or out a display area of the preview image, so that the display area of the preview image is consistent with the updated target visual field.

8. The control method according to claim 1, further comprising:
comparing the area ratio between the area of the object and the area of the target visual field with a ratio range; and
adjusting the target visual field so that the area ratio is equal to the ratio threshold when the area ratio falls outside the ratio range.

9. The control method according to claim 8, wherein the step of the adjusting, when the area ratio falls outside the ratio range, the target visual field so that the area ratio is equal to the ratio threshold comprises:
increasing a size of the target visual field according to the visual field adjusting information when the area ratio is higher than an upper bound of the ratio range, so that the area ratio is equal to the ratio threshold; and
decreasing, the size of the target visual field according to the visual field adjusting information when the area ratio is lower than a lower bound of the ratio range, so that the area ratio is equal to the ratio threshold.

10. The control method according to claim 1, further comprising:
detecting a positional relationship between a plurality of boundaries of the initial visual field and the object; and
adjusting an image capturing direction of the image capture device according to a set direction when a distance between the object and one of the boundaries is smaller than a reference value, to adjust the object to a set position in the initial visual field.

11. The control method according to claim 10, wherein the set position is a center position of the initial visual field in the horizontal direction when the set direction is a horizontal direction, and the set position is a vertical position of the initial visual field in the horizontal direction when the set direction is a vertical direction.

12. An electronic device, comprising:
an image capture device, having an initial visual field;
a display, configured to display a preview image; and
a controller, coupled to the image capture device and the display, wherein the controller is configured to execute following steps:
tracking an object in the initial visual field to obtain a first reference position;
obtaining a reference visual field according to the first reference position;
generating visual field adjusting information according to the initial visual field and the reference visual field; and
adjusting, based on the visual field adjusting information, the reference visual field to obtain a target visual field according to a size of the object,
wherein an area ratio between an area of the object and an area of the target visual field is larger than a ratio threshold, and the area ratio is smaller than 1.

13. The electronic device according to claim 12, wherein the controller is further configured to execute following steps:
setting the initial visual field according to a first magnification; and
setting, based on the reference position, the reference visual field according to a second magnification,
wherein the second magnification is M times the first magnification, and M is a real number larger than 1.

14. The electronic device according to claim 12, wherein the controller is further configured to execute following steps:
detecting a plurality of first endpoints of the initial visual field and a plurality of second endpoints of the reference visual field;
obtaining a plurality of visual field adjusting paths according to the first endpoints and the second endpoints respectively corresponding to the first endpoints; and
generating the visual field adjusting information.

15. The electronic device according to claim 12, wherein the display is further configured to zoom in or out a display area of the preview image, so that the display area of the preview image is consistent with the target visual field.

16. The electronic device according to claim 12, wherein the controller is further configured to execute following steps:
obtaining an updated reference visual field according to the second reference position when the object moves from the first reference position to a second reference position and a distance between the second reference position and the first reference position is larger than a default distance threshold;

generating an updated visual field adjusting information according to the initial visual field and the updated reference visual field; and adjusting the target visual field according to the updated visual field adjusting information to obtain an updated target visual field.

17. The electronic device according to claim 16, wherein the display is further configured to zoom in or out a display area of the preview image, so that the display area of the preview image is consistent with the updated target visual field.

18. The electronic device according to claim 12, wherein the controller is further configured to execute following steps:

comparing the area ratio between the area of the object and the area of the target visual field with a ratio range; and adjusting the target visual field when the area ratio falls outside the ratio range, so that the area ratio is equal to the ratio threshold.

19. The electronic device according to claim 18, wherein the controller is further configured to execute following steps:

increasing a size of the target visual field according to the visual field adjusting information when the area ratio is higher than an upper bound of the ratio range, so that the area ratio is equal to the ratio threshold; and decrease the size of the target visual field according to the visual field adjusting information when the area ratio is lower than a lower bound of the ratio range, so that the area ratio is equal to the ratio threshold.

20. The electronic device according to claim 12, wherein the controller is further configured to execute following steps:

detecting a positional relationship between a plurality of boundaries of the initial visual field and the object; and driving, an actuator to adjust an image capturing direction of the image capture device according to a set direction when a distance between the object and one of the boundaries is smaller than a reference value, to cause the object to be located at a set position in the initial visual field, wherein, the set position is a center position of the initial visual field in the horizontal direction when the set direction is a horizontal direction, and the set position is a vertical position of the initial visual field in the horizontal direction when the set direction is a vertical direction.

* * * * *